United States Patent
Mellott et al.

(10) Patent No.: US 8,438,239 B2
(45) Date of Patent: May 7, 2013

(54) APPARATUS AND METHOD FOR SHARING DATA AMONG MULTIPLE TERMINAL DEVICES

(75) Inventors: Mark Mellott, Pittsburgh, PA (US); Brian Bender, Jeannette, PA (US); Ryan Zoschg, Pittsburgh, PA (US); Andrew Snyder, North Huntingdon, PA (US); Harry Karatassos, Cranberry Township, PA (US); Peter Lehotay, Pittsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 1590 days.

(21) Appl. No.: 11/382,798

(22) Filed: May 11, 2006

(65) Prior Publication Data

US 2007/0266109 A1 Nov. 15, 2007

(51) Int. Cl.
*G06F 15/16* (2006.01)
*G06F 15/173* (2006.01)
*G06F 3/00* (2006.01)
*G06F 13/12* (2006.01)

(52) U.S. Cl.
USPC ........... 709/217; 709/203; 709/223; 709/224; 710/3; 710/14; 710/62; 710/72; 710/74

(58) Field of Classification Search .................. 709/200, 709/223, 224, 203, 217; 710/3, 14, 62, 72, 710/74
See application file for complete search history.

(56) References Cited

U.S. PATENT DOCUMENTS

| | | | |
|---|---|---|---|
| 4,641,126 A | 2/1987 | Crowe | |
| 5,193,183 A | 3/1993 | Bachman | |
| 5,289,378 A | 2/1994 | Miller | |
| 5,465,207 A | 11/1995 | Boatwright | |
| 5,534,765 A | 7/1996 | Kreisinger | |
| 5,563,496 A | 10/1996 | McClure | |
| 5,694,318 A | 12/1997 | Miller | |
| 5,698,967 A | 12/1997 | Baer | |
| 5,701,068 A | 12/1997 | Baer | |
| 5,832,274 A | 11/1998 | Cutler | |
| 5,914,585 A | 6/1999 | Grabon | |
| 6,081,096 A | 6/2000 | Barkat | |
| 6,105,096 A * | 8/2000 | Martinelli et al. | 710/306 |
| 6,115,387 A * | 9/2000 | Egbert et al. | 370/423 |
| 6,194,866 B1 | 2/2001 | Olsson | |
| 6,324,693 B1 * | 11/2001 | Brodersen et al. | 717/177 |
| 6,359,872 B1 | 3/2002 | Mahany | |
| 6,573,826 B2 | 6/2003 | Pan | |
| 6,630,812 B1 | 10/2003 | Davis | |
| 6,771,491 B2 | 8/2004 | Tojo | |
| 6,774,604 B2 | 8/2004 | Matsuda | |

(Continued)

OTHER PUBLICATIONS

US 6,075,780, 06/2000, Mahany et al. (withdrawn)

*Primary Examiner* — David Lazaro
*Assistant Examiner* — Farzana Huq
(74) *Attorney, Agent, or Firm* — Wood, Herron & Evans, LLP

(57) ABSTRACT

Apparatus and method for propagating data between multiple terminal devices includes determining the functional operability of a plurality of devices to assess which devices are properly configured. If a device is properly configured, operating the device in a transmit-mode to transmit functional operability data. If a device is not properly configured, operating the device in a receive-mode to receive the functional operability data. Coupling a transmitting device and at least one receiving device to a plurality of ports that are operably connected together so that the transmitting device and receiving device share the functional operability data.

39 Claims, 4 Drawing Sheets

U.S. PATENT DOCUMENTS

| | | |
|---|---|---|
| 6,937,947 B2 | 8/2005 | Trembley |
| 6,981,034 B2 | 12/2005 | Ding |
| 6,988,200 B2 * | 1/2006 | Iwamoto ......................... 713/170 |
| 6,990,577 B2 | 1/2006 | Autry |
| 6,990,659 B1 | 1/2006 | Imai |
| 7,135,836 B2 | 11/2006 | Kutkut |
| 7,293,127 B2 * | 11/2007 | Caruk ........................... 710/305 |
| 7,356,627 B2 * | 4/2008 | Haverinen et al. ............... 710/62 |
| 7,401,111 B1 * | 7/2008 | Batman et al. ................ 709/200 |
| 7,493,384 B1 * | 2/2009 | Philyaw ........................ 709/224 |
| 7,511,848 B2 * | 3/2009 | Crosier et al. ............... 358/1.15 |
| 7,594,038 B2 * | 9/2009 | Humphries et al. ............... 710/8 |
| 7,729,326 B2 * | 6/2010 | Sekhar .......................... 370/338 |
| 7,818,295 B2 * | 10/2010 | Mihaylo et al. ............... 707/618 |
| 2004/0148598 A1 | 7/2004 | Kita |
| 2004/0164706 A1 | 8/2004 | Osborne |
| 2004/0168094 A1 * | 8/2004 | Chen et al. ..................... 713/300 |
| 2004/0187164 A1 * | 9/2004 | Kandasamy et al. ......... 725/132 |
| 2004/0230969 A1 | 11/2004 | Huang |
| 2004/0243994 A1 | 12/2004 | Nasu |
| 2004/0261071 A1 | 12/2004 | Chuang |
| 2005/0010698 A1 * | 1/2005 | Haverinen et al. ................ 710/3 |
| 2005/0085211 A1 | 4/2005 | Welles |
| 2005/0156735 A1 * | 7/2005 | Humphries et al. ..... 340/539.13 |
| 2005/0273488 A1 * | 12/2005 | Ryan et al. .................... 709/203 |
| 2006/0003806 A1 * | 1/2006 | Weber et al. .................. 455/561 |
| 2006/0031828 A1 * | 2/2006 | Won et al. ..................... 717/168 |
| 2006/0037013 A1 | 2/2006 | Kang |
| 2006/0041882 A1 | 2/2006 | Shah |
| 2006/0268771 A1 * | 11/2006 | Sekhar .......................... 370/329 |
| 2007/0123249 A1 * | 5/2007 | Sun ............................... 455/423 |

* cited by examiner

APPARATUS AND METHOD FOR SHARING DATA AMONG MULTIPLE TERMINAL DEVICES

FIELD OF THE INVENTION

This invention relates generally to sharing data among multiple devices and more specifically to rapidly configuring multiple mobile computer terminal devices to have a desired functional operability.

BACKGROUND OF THE INVENTION

Wearable, mobile and/or portable devices, such as portable computer terminal devices, are used for a wide variety of different tasks. Such terminal devices allow the workers using them ("users") to maintain mobility in their jobs, while providing the worker with desirable computing and data-processing functions on location when they need them. Furthermore, such terminal devices often provide a communication link to a larger, more centralized computer system or network that directs the activities of the user and processes any data that is collected through use of the terminal device.

One example of a specific use for such a wearable/mobile/portable terminal device is within a voice or speech driven work environment. Using a voice or speech dialog through the terminal device, a worker is directed through various tasks. That is, the work environment, including a central computing system and a plurality of speech-enabled terminal devices, is implemented using human speech. The terminal devices communicate with the central system over a wireless network. Speech is synthesized and played to the user, via the mobile terminal device, to direct the tasks of the user and to collect data. The user then provides answers in the dialog or asks questions, and the speech recognition capabilities of the mobile terminal device convert the user speech to a form suitable for use by the terminal device and central system. Thereby, using speech, a bidirectional communication stream of information is exchanged over a wireless network between the wireless wearable terminal device and the central computer system.

One specific example of a voice-enabled system is a product management system used in various inventory/order-based industries, such as food and retail product distribution, manufacturing, and quality control, for example. A central computer system runs a program for product tracking, management and order filling, and interfaces with multiple terminal devices and their users through a wireless communication network. The users perform various manual tasks, such as product picking and placement, per instructions they receive through the terminal device, via the central system and wireless network. The terminal device also allow the users to interface with the central computer system, such as to respond to inquiries or confirm the completion of certain tasks and to collect data, among other tasks.

In order to communicate with the wireless network, and ultimately with a central system, the individual terminal devices must be properly configured or enabled. Once so configured, they will be able to transmit data back and forth with a central system utilizing the wireless network. If not properly configured, they are not able to do so. Usually, the initial configuration of the terminal devices for an on-site wireless network is cumbersome, time-consuming and inefficient. It is particularly so because many applications and/or facilities might utilize a large number of terminals, corresponding to a large number of users or workers at the facility.

For example, in a typical application using terminal devices, the specific configuration file for use with a chosen wireless network is created to be downloaded to a terminal device. A cable is then connected between the terminal device and generally a host computer or other management system containing the proper configuration information. The terminal device is placed into a special state or mode for having the configuration file downloaded thereto. Then, the new configuration might be permanently stored or burned into the memory of the terminal device through further operation of that device. Once properly configured or enabled, the terminal device can then operate on the network.

As may be appreciated, while this process might be suitable for a small application, or with a wireless network that does not often change, the process of configuring a large number of terminals in this fashion is cumbersome and inefficient. Furthermore, it may be desirable or necessary to replace or repair one or more of the terminal devices, or to add additional terminal devices onto the network at a work site or facility. For new terminal devices, and those that have been repaired or replaced, the same cumbersome configuration procedure must take place, wherein each terminal device is individually coupled with the host computer with a cable for downloading a configuration file to allow the terminal device to operate on the selected wireless network.

Once on the network, one or more terminal devices might be selected to receive additional downloaded information, such as downloaded configuration files. However, each of those terminals still must be initially configured to operate with the wireless network before they can communicate and receive other information or data. While various features might be utilized to facilitate configuration, such as software control of the initial configuration to walk a user through the various initial steps, the cumbersome task of a one-by-one initial terminal configuration is still necessary.

For a site which has several hundred terminals, such a process may take hours. Furthermore, knowledge regarding a particular site's wireless network is still not particularly useful or practical for terminal device manufacturers which are initially configuring the devices. There are literally an infinite number of different networks with different parameters and settings that might be required to initially configure the terminals to work at an on site location. Furthermore, the customers or end users are usually reluctant to provide their network settings to the terminal device manufacturers in order to enhance any initial configurations or to make re-configuration simpler and more efficient after a repair or replacement.

Accordingly, to date, there has not been a practical and efficient way to avoid configuring terminal devices, one-by-one, to operate on a wireless network. As such, a tedious process is still necessary when either initially configuring terminal devices for a particular facility and network, or later adding terminal devices to the network and/or repairing and replacing malfunctioning terminals.

The present invention addresses such drawbacks in the prior art and provides terminal devices, apparatuses and methods for efficiently sharing data amongst multiple devices and providing them with the necessary or desired functional operability, such as a network configuration for a wireless network. The various advantages of the invention are more readily evident from the Detailed Description of the invention as set forth hereinbelow.

BRIEF DESCRIPTION OF THE DRAWINGS

The accompanying drawings, which are incorporated in and constitute a part of this specification, illustrate embodiments of the invention and, together with a general description of the invention given above and the Detailed Description given below, serve to explain the invention.

DETAILED DESCRIPTION OF EMBODIMENTS OF THE INVENTION

The present invention is directed to terminal devices, apparatuses and methods for efficiently sharing data between devices, and particularly for sharing functional operability data between an enabled terminal device and a plurality of non-enabled terminal devices. The shared data configures and enables the non-enabled devices for operating with a desired functional operability. In an illustrated embodiment as discussed herein, the terminal devices share data to configure one or more devices for operating on a wireless network. As such, the exemplary embodiment provides the ability to quickly and efficiently configure terminal devices for operation with a wireless network. However, the invention is not limited to only network configurations, per se, but may be used to share data for other desired functions and functional operability as well.

In one exemplary embodiment, the inventive apparatus and method utilize multiple docking bays containing transmit and receive ports. When the terminal devices are placed in the docking bays, the terminals operate to share data between the ports and the terminal devices coupled to the ports. A single configured terminal device, which has the desired functional operability, is able to operate in transmit-mode and share its functional operability data with a plurality of other non-configured terminal devices that operate in receive-mode. For example, a single terminal device, which is configured to operate on a wireless network and has the desired functional operability, is utilized with a transmit port. The configured terminal device, on coupling with the transmit port and verifying that it has the desired functional operability, enters a transmit-mode and begins transmitting its functional operability data. A plurality of non-configured terminal devices interface with a plurality of receive ports that are coupled with the transmit port. Upon coupling a properly configured terminal device with the transmit port and the other non-configured terminal devices with the receive ports and verifying that the terminal devices should receive the data, data is shared between the ports. The receiving terminal devices receive and are configured with the desired functional operability data. That is, the non-enabled receive-mode devices are converted to enabled devices that can operate in the transmit-mode. Those configured terminals can then be used to configure other terminals in the same fashion. By repeating this process, a large number of non-configured terminal devices may be quickly and efficiently configured using only one originally configured terminal device.

Figure 1:
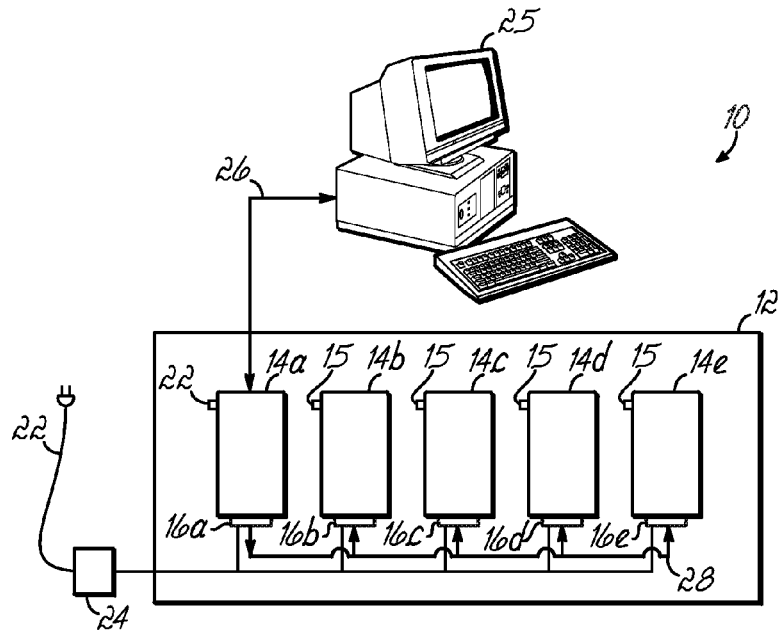
FIG. 1 is schematic block diagram of a system for sharing data according to an embodiment of the present invention.

FIG. 1 is a schematic block diagram illustrating one embodiment of a system for practicing the present invention. Specifically, system 10 incorporates the various components necessary for transferring and sharing functional operability data between terminal devices, such that a single configured terminal device may be utilized to share data with, and therefore configure, other non-configured devices with a desired functional operability for the devices to work in their desired environment (e.g., a wireless network). Specifically, system 10 incorporates an apparatus 12 for transferring and sharing data between multiple terminal devices 14a-14e. As discussed in the exemplary embodiments disclosed herein, the devices 14a-14e are portable computer terminal devices which may be carried by a user, mounted on equipment, or worn on the body of a user. In a more specific exemplary embodiment, the terminal devices 14a-14e are voice-enabled or speech-enabled terminal devices which are worn by workers and are configured to operate with a central computer or system through a wireless network. As discussed further with respect to FIG. 3, terminal devices 14a-14e include the necessary processing circuitry hardware and software for not only interfacing between a worker and the central system utilizing speech, but also for communicating data and other information back and forth with the central system through a wireless network. Such terminal devices must be properly configured to work with the wireless network, such as at a particular site, warehouse or other facility, and thus, must contain the necessary network configuration information, such as network settings, security keys, and other data and information that are necessary for the desired network functional operability. As noted above, while the discussed and illustrated exemplary embodiments of the invention are directed to configuring terminal devices to operate on a wireless network, the invention is not limited to only network or wireless network functional operability. Rather, other functional operability data might be shared as well using the invention. The present invention addresses drawbacks in the art by providing for rapid and efficient data transfer and sharing between various terminal devices using only one originally configured or enabled terminal device.

Apparatus 12 includes a plurality of ports 16a-16e wherein at least one of the ports, such as port 16a, is configured to operate as a transmit port to transmit data. At least one of the other ports, and preferably a plurality of other ports in apparatus 12, such as ports 16b-16e, are configured to operate as receive ports to receive data that is transmitted by the terminal device 14a coupled with transmit port 16a. That is, in apparatus 12 the transmit port 16a is configured for transmitting data from device 14a to the receive ports of 16b-16e. The receive ports, in turn, are configured for receiving data from the transmit port 16a for uploading the transmitted data to the devices 14b-14e coupled to the respective receive ports.

In one embodiment, the ports are serially connected together and the transmit port is only capable of transmitting data to the receiving ports but not receiving data. Conversely, the receive ports are only capable of receiving data from the transmit port and not transmitting data. The terminal devices may act as either a transmit-mode device or a receive-mode device, based on the devices' operability. Generally, when a terminal device that is properly enabled or configured (i.e., has the desired functional operability) is coupled to a transmit port and its operability is verified, it enters a transmit-mode state and begins repeatedly transmitting functional operability data to the receive ports. Non-enabled or unconfigured terminal devices are coupled with the receive ports and, upon verifying their non-operability, the devices enter a receive-mode state wherein they are operable to receive functional operability data that is transmitted by the transmit-mode terminal. In that way, a single configured terminal device may be used to configure a plurality of other terminal devices. Before sharing or distributing the data, the transmit-mode device might perform one or more tests to verify that the data it has is distributable or sharable and that it is authorized to share it as discussed below.

Figure 4:
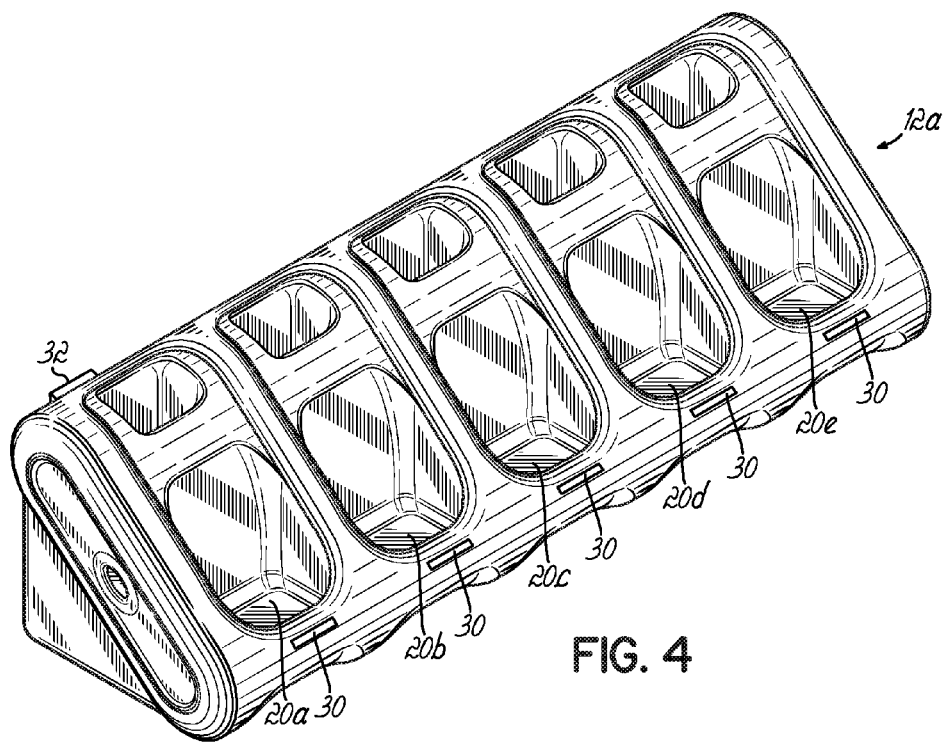
FIG. 4 is a perspective view of a charger apparatus in accordance with an embodiment of the present invention.

Turning to FIG. 4, the data sharing apparatus 12 might take the form of a battery charger device 12a incorporating multiple docking bays 20a-20e that are configured for cradling or docking the terminal devices for a variety of purposes. For example, portable terminal devices will generally have portable power sources, such as rechargeable batteries. Therefore, they will often have to be coupled to a battery charger. Thus, one convenient embodiment of the invention is a battery charger or terminal charger which has bays 20a-20e configured to receive respective terminal devices 14a-14e for recharging their batteries, and also for sharing data between the terminal devices in accordance with the principles of the present invention. As illustrated in FIG. 1, each of the ports 16a-16e may be operably coupled to a power cord 22 for coupling to an external power source, such as an AC outlet. Suitable transformer and power supply circuitry 24 might be utilized to provide the necessary power conversion from AC to DC, for recharging the batteries of the terminal devices. In that way, implementing the invention is simply handled by placing terminal devices in their respective charger docking bays, as will be readily and easily understood by traditional users of such terminal devices and chargers.

In the embodiment, as illustrated in FIG. 1, the various ports are coupled together with a wired connection, such as a serial connection for serially transferring data between the terminal devices. The wired serial connection in the charger 12a is a cost-effective and simple implementation of the invention. In an alternative embodiment, the connection between the ports 16a-16e might also be wireless, such as a blue tooth standard.

Initially, the functional operability data to be shared must be downloaded or installed onto at least one terminal device to give it the desired functional operability or configuration. For example, a management console or computer 25 with appropriate device terminal management software might be coupled to terminal device 14a, such as with a serial cable 26 as illustrated in FIG. 1. With the terminal device placed in a receive-mode, the functional operability data is downloaded from the management console 25 so that the terminal device may be converted to operate as a transmit-mode device upon coupling to a respective port. That is, the device has the proper data to be enabled (e.g., can operate on a network) and can thus share the data it has or share other data that it can access from another device, (e.g., from console/computer 25), with other non-enabled or receive-mode terminal devices.

In one aspect of the invention; a terminal device that is properly configured and thus may operate in a transmit-mode state, such as terminal device 14a will convert to transmit-mode automatically upon the occurrence of a trigger event. For example, the trigger event might include the receipt of a trigger signal (e.g. a power charge signal) by the device. The device 14a might also otherwise detect that it has been coupled with transmit port 16a or has been placed in bay 20a. Once coupled with port 16a, the terminal device 14a makes the determination that it has the desired functional operability data and that the data may be shared or distributed. The device might also verify that it is authorized to transmit. The device then enters the transmit-mode state where it continually transmits functional operability data, such as data that is useful for configuring or converting the other terminal devices 14b-14e to have the same functional operability as terminal device 14a in a certain regard. The terminal devices 14b-14e coupled with receive ports 16b-16e verify that they do not have the proper configuration and enter the receive-mode. In the receive-mode, they are operable to receive the data from the transmit-mode terminal device and to use that data to convert to operable or enabled devices with the desired functional operability.

In a wireless network example, the functional operability of the terminal device 14a that is to be shared is associated with its network configuration and compatibility. In that example, the functional operability data shared with the other terminal devices 14b-14e is directed to network configuration data, such as network parameters, security keys, radio settings, ID parameters, and other parameters that are necessary to get on and interact with a wireless network. In other examples, other functional operability data might also be transferred and shared in accordance with the principles of the invention. The present invention is useful for providing rapid and efficient data sharing between multiple terminal devices to use one enabled device to convert a plurality of non-enabled devices, regardless of the functional operability of the terminal devices at issue.

For serially connected ports in the example of FIG. 1, the data from terminal device 14a is transmitted serially through transmit port 16a to the other receive ports 16b-16e. The transmit port 16a might be hardwired to act only as a transmit port and therefore only transmit data, but not receive data. To that end, for a port represented by a plug with multiple sockets or a connector with multiple pins, a single socket or pin designated as a transmit element might be operably coupled to the terminal device in the transmit port 16a wherein a similar receive socket or pin is disabled for the transmit port 16a. Similarly, the receive sockets 16b-16e might be appropriately hardwired so that only the receive pins or sockets of ports 16b-16e are connected with the transmit pin or socket of transmit port 16a. To that end, the receive ports would then only receive data and would not be able to effectively transmit data to other terminal devices coupled with the ports 16a-16e. In such a serial hardwired configuration, a terminal device that is properly configured/enabled is coupled with the transmit port, whereas all other non-configured devices are coupled with appropriate receive ports. It may be desirable to use such a hardwired configuration, as users would then become familiar with the fact that one of the docking bays (e.g., bay 20a) has a transmit port whereas all the others have receive ports. In the embodiments illustrated in the figures, four terminal devices may then be properly configured by sharing data from a single transmitting terminal device. Other port configurations might also be used.

Figure 2:
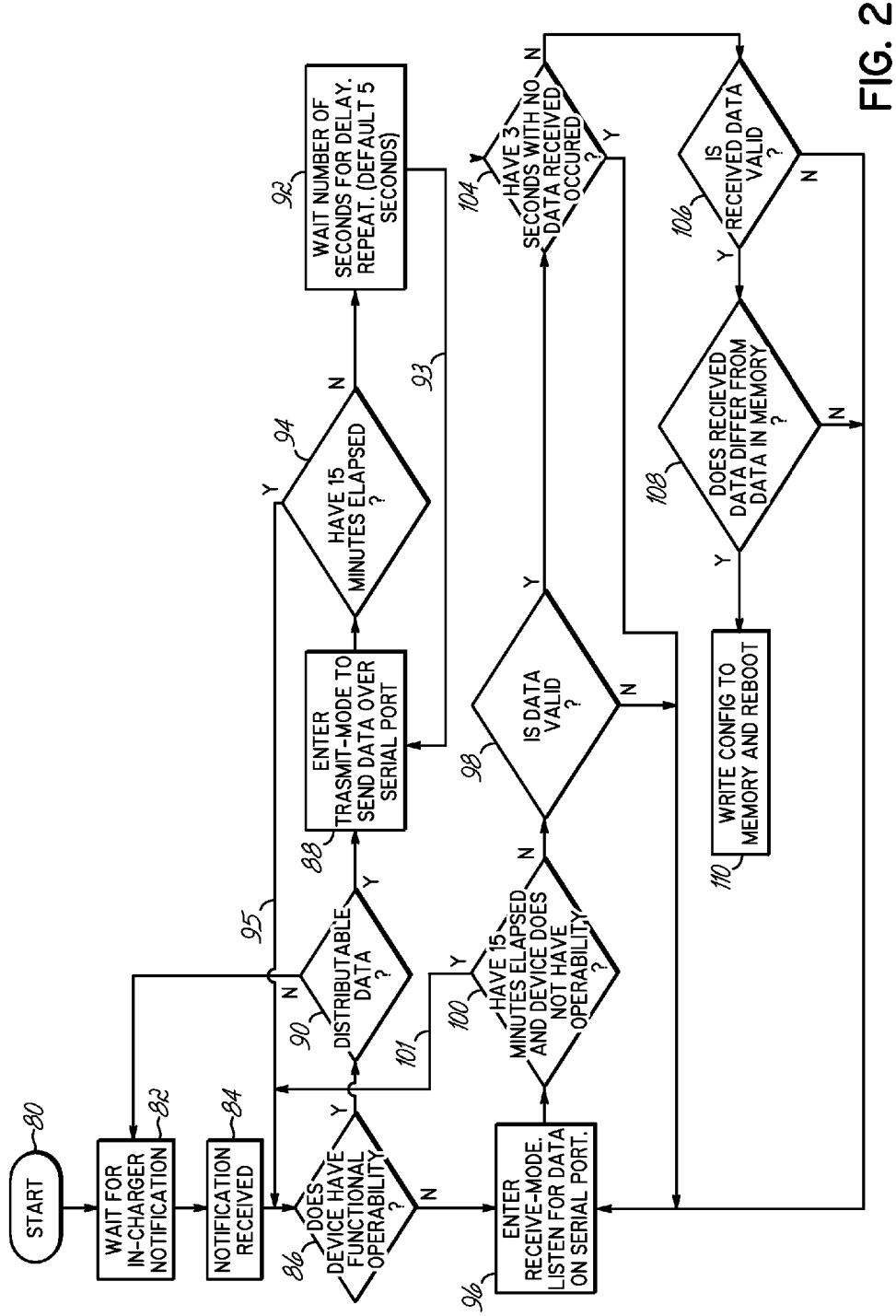
FIG. 2 is a flowchart of the operation of one embodiment of the present invention.

FIG. 2 illustrates a flow chart describing one exemplary embodiment of the invention. The processing hardware/software of the terminal device and the various other related components are configured to provide the necessary functionality for implementing the invention. Starting at block 80, the terminal device monitors the occurrence of a trigger event to determine if it is appropriate to transmit or receive data. For example, the trigger event may include coupling a terminal device with a respective port 16a-16e in a docking bay of apparatus 12a such that the device receives a trigger signal or some other indication of the trigger event. In the case of a battery charger 12a, the trigger event might be placement in the charger and receipt of a power signal, and the terminal device waits to be notified that it is placed in a charger (block 82). The terminal devices will also be recharged while in the docking bays. Other different trigger events might also be utilized.

Until the occurrence of the trigger event, the terminal device generally is dormant with respect to sharing data or entering a transmit-mode or receive-mode. That is, it functions as it is normally configured to do. If the trigger event occurs, such as the notification that the terminal device is placed in the charger (block 84), the terminal device makes a determination of whether it has the desired functional operability and functional operability data, such as whether it is enabled for communicating with a wireless network (block 86). For example, the terminal device might make a determination about whether it can talk to a particular management software program available at the management console 25 over the wireless network. If a terminal device has the desired functional operability or is otherwise enabled in some sense, this is used as an indication that the terminal device has the functional operability data that may be shared. As such, that terminal device can then be used as a transmit terminal device, or placed in the transmit-mode, for sharing the functional operability data with other non-enabled terminal devices. Therefore, the terminal device can transmit the functional operability data to receiving terminal devices over the respective serial ports 16a-16e and will enter transmit-mode (block 88). If a non-enabled terminal device is coupled to a transmit port, it might enter receive-mode but will not receive data because the transmit port is not configured to do so.

In one embodiment, the terminal device will only transmit or share the data if certain criteria are met and the data has been designated as distributable from the transmit-mode terminal (block 90). The terminal device might make this determination on its own or may check with a management console 25 as to the distributable nature of the data. For example, the transmit mode device may have to have the management console verify that the configuration or other functional operability data is proper and/or that the transmit-mode device is authorized to transmit that data. Furthermore, the data file, such as a configuration file, may have to be marked or otherwise designated as "distributable" or "shareable." The criteria, testing and verification (block 90) ensures that the wrong data is not propagated to the receive-mode terminals.

If the criteria is not met and the data is not distributable, then it is not transmitted over the serial port and control returns to block 82. The data that is transmitted will be transmitted repeatedly on a cyclical basis (block 92). For example, the data might be transmitted, and then the terminal device may wait a specified amount of time for delay (e.g., five seconds) and then resend the data as noted by path 93.

In one embodiment of the invention, the terminal device may continually check to see if it still has the desired functional operability, such as it is still operable with the wireless network. For example, as illustrated in block 94, the terminal device might make a determination of its last contact with the wireless network, or with a software application accessible over the wireless network (e.g., a management application). If a certain amount of time has elapsed since its operability was last verified (e.g., fifteen minutes), the terminal again makes a determination of whether it has the functional operability data and desired functional operability (block 86), as indicated by path 95. For example, there may have been a network change within that amount of time, which would make the current configuration inoperable. Also, a change or re-configuration of the terminal device management console 25 could make the current configuration inoperable.

As such, the program flow in blocks 86-95 of FIG. 2 illustrates the progress of an enabled terminal device that enters transmit-mode and is capable of transmitting or sharing its functional operability data with other non-enabled terminal devices. As such, the transmitting terminal device is considered to be in the transmit-mode upon making the determination that it is enabled or configured as desired, or otherwise has some desirable functional operability and associated data that is to be shared with other non-enabled terminal devices. It should be noted that if the terminal device does not have the desired functional operability, it will not transmit data. Rather, it may convert to or enter receive-mode as noted below.

The functional operability data to be shared may be data that is contained on the transmit-mode terminal device. Alternatively, the data to be shared might be from another device, such as console 25. In that case, the transmit-mode terminal device will obtain the data from the other device to be distributed to the receive-mode terminal devices. This provides an additional way for the invention to verify the data that is shared. For example, the terminal device might have multiple configurations that are distributable and it may be desirable to make sure that only the proper one is sent.

If the terminal device determines that it is not so enabled or does not have the necessary functional operability data for a desired operability or for performing a specific task, the terminal device enters what might be considered receive-mode, and listens for data on the serial port 16b-16e (block 96). As such, if the terminals are known to be either a transmit-mode terminal (has operability) or receive-mode terminal (does not have operability), it will generally be desirable to couple those enabled terminal devices with a transmit serial port (i.e. 16a) and those non-enabled terminal devices with a receive serial port (i.e. 16b-16e). If a device coupled to the receive port has the desired functional operability, it is disabled from receiving any transmitted data. It may then be placed in transmit mode. However, if the receive port is not configured to transmit, the transmit-mode terminal will not affect other terminal devices.

As data is received, a receiving terminal device determines if the received data is valid (block 98). For example, for serial data, the header might be examined, and a certain number of data bytes might be expected. There may be various other ways to determine validity. If the data is shared in a wireless format rather than in a serial format, for example, the transmit device might have to be authenticated first. If the ports are connected with a wireless link, for example a Bluetooth wireless link, there might be various steps taken to verify that the communication over the wireless link is secure. Encryption might be used. The receive port and/or the receive-mode device in the port might authenticate the transmit-mode device to ensure that it is proper to receive data from that device. Other steps might also be taken, as are know in the art, wherein the receive-mode device and the transmit-mode device exchange necessary credentials and information. If the data that is being received is not valid, the terminal device will continue to listen on the serial port.

Similar to the terminal device in transmit-mode, a device in receive-mode may also make a determination after receipt of data of whether it does or does not have the desired operability after a certain period of time (e.g., fifteen minutes) (block 100). For example, at block 100, a decision is made to make sure that the device should be in receive-mode and therefore receiving data. If a certain amount of time has elapsed as indicated by path 101, and the device does not have the desired operability, the receive terminal device may then go and make a determination via block 86 of whether it has the desired functional operability, such as whether it can communicate with the wireless network. If the designated amount of time has not elapsed, the terminal device will continue as shown in FIG. 2. If a timeout period (e.g., three seconds) has passed with no data being received (block 104), then the terminal device continues to remain in receive-mode and to listen for and receive data on the port (block 96). Block 104 is also used to handle partially received data. That is, if the receiving terminal device/port starts receiving data part of the way through a transmit cycle, block 104 causes a time out after 3 seconds and control returns to the beginning of the receive processing. If the timeout has not elapsed, a test is made to determine whether the received data is ultimately valid data. For example, certain checks might be made on the received functional operability data to ensure that it is proper for use in the terminal device (block 106). If the data is not valid per block 106, the terminal device will continue to operate in the receive-mode and listen for data from the receive port (block 96).

If the data is valid, pursuant to the test of block 106, a further test is made to determine whether the data is different from the data that is stored in memory, such as flash memory (block 108). If it is not, control returns again to block 96 and the terminal device continues in receive-mode to listen for data from the port. However, if the functional operability data is different than that data stored in memory, the new data is written to memory and the terminal device reboots. Thereafter, the terminal device should have the desired functional operability. For example, if the terminal device receives network configuration data from another terminal device, upon rebooting, the receiving terminal will now be able to access the wireless network and talk to a management program or to console 25 or perform some other function as desired. The data might simply include a bootstrap initial configuration file that contains only the basic information each terminal device needs to connect to the network.

Accordingly, a single transmit terminal device, such as device 14*a*, may be utilized to transmit configuration data and other functional operability data to a plurality of non-enabled terminals to thereby enable those terminals with the desired functionality, such as operability on the wireless network. When an enabled or configured terminal device is placed in a charger, it enters transmit-mode and repeatedly transmits useful data while unenabled terminal devices listen in receive-mode for the data and then connect to the network. Those enabled devices that are coupled to the ports do not listen and thus are not subject to receiving data that could adversely affect them. Similarly, non-enabled terminal devices also do not transmit data, thus keeping them from affecting other terminal devices. This presents a significant efficiency in reconfiguring terminal devices which may need a new configuration, or may have been recently repaired or replaced. As such, a customer utilizing the present invention may be able to quickly bring repaired or replaced terminal devices back online with their network by simply coupling the terminal devices with respective transmit and receive ports, such as in the docking bays of the battery charger 12*a*, similar to a recharging operation. Furthermore, the batteries of the terminal devices will also be recharged during the data transfer operation. Once connected to a network the management console software may then complete the rest of any configuration and manage any configuration updates.

Figure 5:
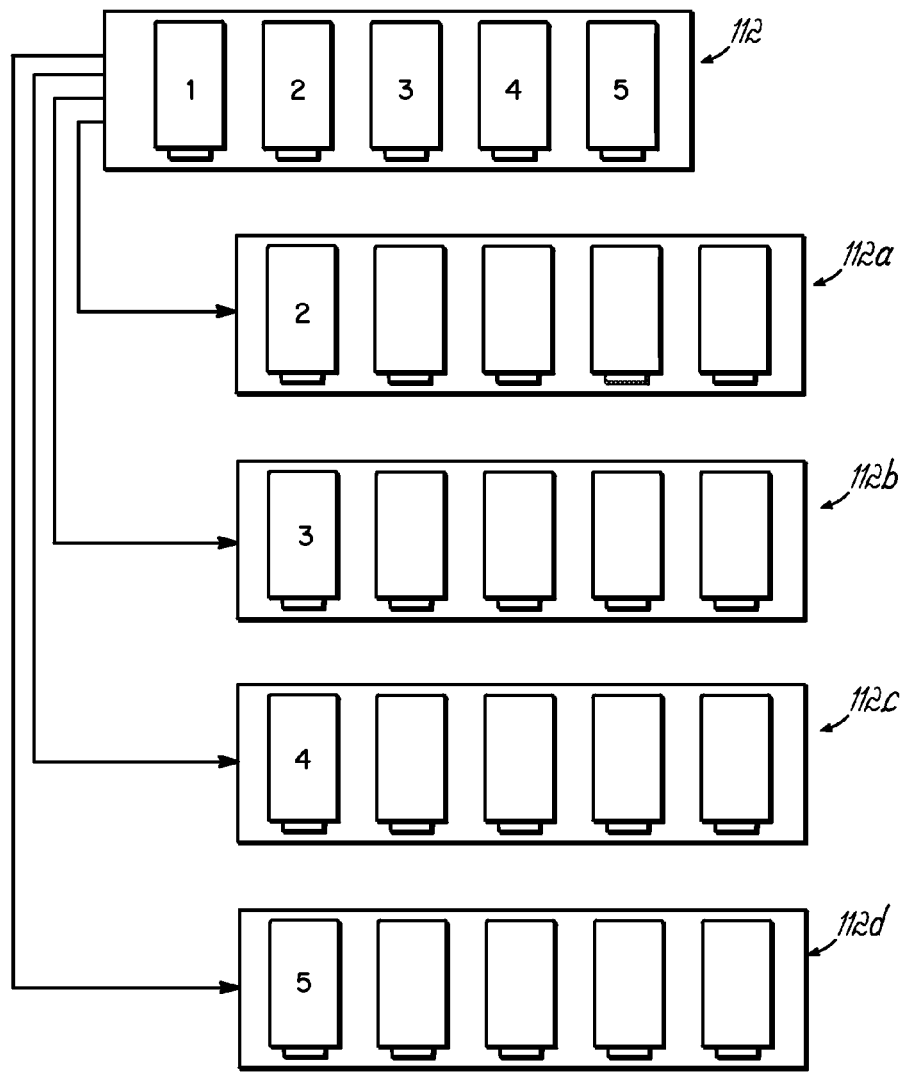
FIG. 5 is a schematic block diagram for an embodiment of the present invention using cascaded apparatuses for sharing data.

An additional feature of the invention is that the newly-enabled or configured terminal devices may then be used with other data transferring apparatuses, such as additional battery chargers, for then each enabling an additional plurality of non-enabled terminal devices. An example of such efficiency is illustrated in FIG. 5. For example, one data sharing apparatus 112 might contain five terminal devices coupled to appropriate ports wherein terminal device 1 is enabled (has the desired functional operability) and is utilized in transmit-mode to share data and thus enable terminal devices 2-5. When the terminal devices 2-5 are properly enabled and configured, they can then each be removed from the first charger or other apparatus 112 and each placed in the transmit port of another of four chargers 112*a*, 112*b*, 112*c* and 112*d*, as the transmitting terminal device. Once placed in the chargers, 112*a*-112*d* the configured terminals will test their functional operability, such as with the wireless network, and will begin transmitting. Non-enabled or unconfigured terminals may then be placed in the empty receive bays of chargers 112*a*-112*d* to further share data and thus enable those other terminal devices. As such, five enabled terminals are then each used to create four more additional terminals and so on in a multiplicative manner. It may be readily appreciated that the invention thus provides a significant efficiency in enabling or configuring new, repaired, replaced, or other non-enabled or non-configured terminal devices.

Generally, at least one device would have to be initially enabled to act as the transmitting terminal device. Accordingly, referring again to FIG. 1, the management console or computer may be utilized in the conventional fashion, such as with a serial cable 26, to load the desired configuration file or other functional operability data onto terminal device 14*a*. To do so, the serial cable is connected to the host computer 25 and to the terminal device 14*a*. Terminal device 14*a* may be placed in the receive-mode state. Thereafter, a configuration file is loaded onto the terminal device 14*a* from the host management computer 25 utilizing a specific management software application. The terminal device then burns the new configuration into the memory of the device, such as by pressing a button or other control provided on the terminal device. The initial terminal device will then be able to operate in a transmit-mode to share data.

As noted in one aspect of the invention, the terminal devices are each operable, based upon a particular trigger event, to determine whether they should transmit data and thus share their functional operability data with other terminals, or whether they should receive data that is being shared by a transmitting terminal. That is, the terminal devices 14*a*-14*e* are operable to operate in a transmit-mode state or transmit-mode, or a receive-mode state or receive-mode based on the trigger event. Generally, the mode therein can be determined by a series of conditions and one or more trigger events for determining the existence of such conditions before operating in either the transmit-mode or receive-mode as discussed herein. In an alternative embodiment, a switch might be used rather than a trigger event or signal. For example, referring to FIG. 1, each terminal device might include a selective manual switch 15 wherein the terminal devices will automatically assume either a receive-mode or a transmit-mode functionality based upon the setting of the selective manual switch.

Generally, each of the terminal devices has the necessary processing circuitry and software, as well as the necessary serial communication circuitry or other communication circuitry and software, such as wireless communication hardware/software, for sharing data by transmitting the data or receiving the data that is reflective of a functional operability that is to be shared between the terminal devices. The terminal devices will also have additional operability depending upon the environment in which the terminal device is to be utilized. One embodiment of a terminal device that may be utilized for the present invention is a speech-enabled terminal, such as the Vocollect Talkman® or T2® or T5® which is sold by Vocollect of Pittsburgh, Pa., the owner of the present application.

Figure 3:
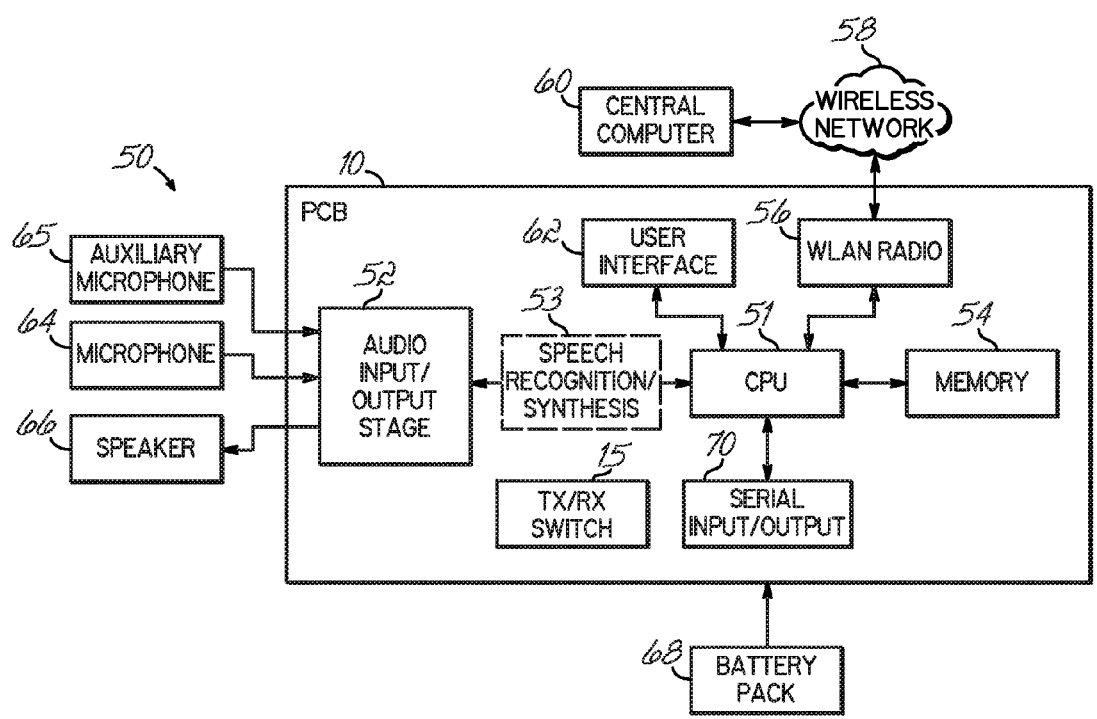
FIG. 3 is a schematic block diagram of a terminal device for use in an embodiment of the present invention.

FIG. 3 illustrates a functional block diagram of a wireless, mobile terminal device 50 suitable for use in an embodiment of the invention. Terminal device 50 provides the necessary functionality for the invention. To that end, processing circuitry or hardware, such as a processor or CPU 51 and associated operating software, provides the functional operability of the terminal for determining when it is to transmit or receive shared data, what data to share, a well as how it is to handle serially transmitted or received data. Processor 51 might also include speech recognition and speech synthesis hardware and software, as well as other application software to direct the activity of a user using the terminal device with speech or voice applications.

Terminal device 50 includes one or more additional components for its desired operation. For example, terminal device 50 may include an audio input/output stage 52 for its speech functionality, memory, such as a flash RAM 54, a WLAN radio 56 for coupling with a wireless network 58 and a central computer 60 or central system, and a user interface or control 62. The audio stage 52 might be configured to couple with a microphone 64 (it may also include an auxiliary microphone 65) and a speaker 66. For powering the terminal, a rechargeable battery, battery pack or other power source 68 is used. For the transmit/receive functionality of the terminal device 50, appropriate serial input/output circuitry 70 is used. For speech or voice functionality, the processor 51 may include the necessary speech recognition/synthesis hardware and software for voice or speech applications or separate hardware and software 53 for speech recognition/synthesis might be used.

Processor/CPU 51 may be a general purpose processor for managing the overall operation of wireless terminal device 50. Processor/CPU 51 may be, for example, a 600 MHz Intel® XScale™ processor, or other processor, indicative of currently available technology. Processor 51 is capable of handling the data sharing functionality of the invention and includes suitable software to do so.

Memory 54 may be a standard memory storage device that serves as the program and data memory device associated with Processor 51. Memory component 54 may be in addition to other memory, such as flash memory, in the processor. While each of the functional blocks is shown separately in FIG. 3, the functionality of certain blocks might be combined in a single device.

WLAN radio component 56 may be a standard WLAN radio that uses well-known wireless networking technology, such as WiFi, for example, that allows multiple devices to share a wireless network 58. WLAN refers to any type of wireless local area network, including 802.11b, 802.11a, and 802.11g and a full 802.11i wireless security suite. The terminal device and component 56 might also be operable for other network standards. Therefore, the present invention is not limited to 802.11 standards or those networks set forth in the exemplary embodiments. WLAN radio 56 is integrated into the terminal devices 50 and is used for transmitting data in real time or in batch form to/from the central computer 60 and receiving work applications, tasks or assignments, for example. In order to operate on a wireless network, the terminal device 50 must have the proper software configuration for the network 58. For example, a wireless device must have the necessary radio settings, security settings and keys, ID parameters, and other network parameters to operate with the wireless network 58, as is known in the art.

In the exemplary embodiment of the invention, a network configuration and its various components, such as radio settings and security settings, are shared among multiple terminal devices so that non-configured terminal devices may be readily configured to operate on the wireless network as disclosed herein. However, the present invention is not limited to simply sharing network configuration information. Rather, the invention might be utilized to share other data which provides a desired functional operability to the terminal device. The data to be shared is generally noted as functional operability data, because the invention might be used to transfer and share data between a terminal device that has a desired functional operability, and other terminal devices that do not.

User interface 62 provides control of the terminal device and is coupled with suitable control components, such as control buttons, for controlling the terminal device 50, such as for initially configuring a terminal device, as noted above, turning power ON/OFF, varying volume, moving through selection menus, etc.

Battery pack 68 is a lightweight, rechargeable power source that provides suitable power for running terminal device 50 and its components and may include one or more lithium-sulfur batteries that have suitable capacity to provide full shift operation of wireless headset terminal device 50 on a single charge.

Figure 7:
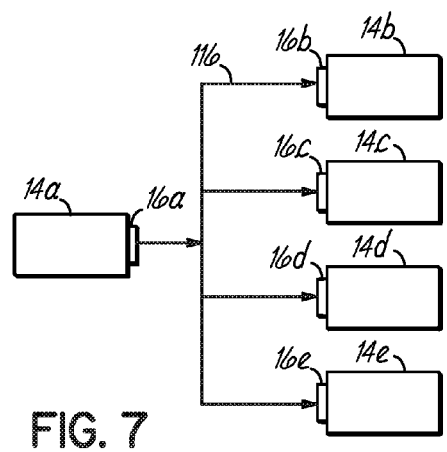
FIG. 7 is a schematic block diagram of another embodiment of the present invention.

Although one exemplary embodiment of a data sharing apparatus discussed herein is in the form of a charger 12A as illustrated in FIG. 4, the various ports 16a-16e might also be incorporated within just a cable fan 116, as illustrated in FIG. 7, wherein the ports are in the form of plugs that may be plugged into the various respective terminal devices 14a-14e. Although not shown in FIG. 7, the cable fan 116 might also incorporate the necessary connections to an external power supply for also charging the rechargeable batteries of the terminal devices simultaneous with the sharing and transfer of data in accordance with the principles of the invention.

In accordance with another aspect of the present invention, each of the docking bays and the respective ports might be operably coupled with appropriate switches 30, as shown in FIG. 4, for selectively switching the ports between being configured to act as a receive port or being configured to act as a transmit port. In that way, any of the ports 16a-16e might be selected to be the transmit port, whereas, others of the ports might be selected to be receive ports. In one disclosed embodiment as discussed above, the ports 16a-16e are serially hardwired to act as either transmit ports or receive ports. The transmit ports are only configured to transmit data and the receive ports are only configured to receive data. However, using switches 30, the ports might be selectively switchable to act as a receive port or as a transmit port as desired.

In another embodiment of the invention, the apparatus 12a housing the ports might be coupled with an override switch 32 as shown in FIG. 4 to disable the data transfer and sharing functionality of the apparatus. For example, reconfiguring terminal devices might only be a rare occurrence, whereas, battery charging may be the main focus of the apparatus 12a. As such, the switch 32 might provide the desired selective disabling of the ports from acting as transmit ports or receive ports and, thus, disabling the data transfer capabilities of the apparatus 12a.

Figure 6:
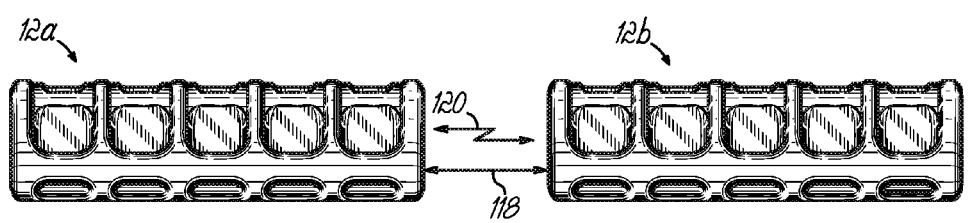
FIG. 6 is a perspective view of another embodiment of the present invention.

FIG. 6 illustrates another embodiment of the invention wherein various of the data-sharing apparatuses might be ganged or coupled together for communicating with each other such that a single terminal device may be utilized to share data with an even greater number of other non-enabled terminal devices. For example, the charger apparatus 12a might be coupled in a wired fashion 118 (e.g., a serial cable) or wireless fashion 120 to one or more other charger apparatuses 12b to expand the number of terminal devices that may share data with a transmitting terminal device. One port in terminal 12a or 12b might be the designated transmit port while all other are receive port.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of representative apparatus and method, and illustrative examples shown and described. Accordingly, departures may be made from such details without departure from the spirit or scope of applicant's general inventive concept.

What is claimed:

1. A method of sharing functional operability data between a plurality of terminal devices comprising:
    gathering a plurality of terminal devices that are each selectively configurable to operate as either a transmit-mode device or a receive-mode device when sharing functional operability data;
    coupling at least one terminal device that has desired functional operability data and a plurality of terminal devices which lack the desired functional operability data to a plurality of ports that are coupled together with a data transfer connection;
    monitoring the occurrence of a trigger event when the terminal devices are coupled to the plurality of ports and determining if a terminal device has desired functional operability data for distribution;
    upon the occurrence of a trigger event, automatically operating the at least one of the terminal devices in a transmit-mode state as a transmit-mode terminal device if it has the desired functional operability data and operating other devices of the plurality of terminal devices in a receive-mode state as receive-mode terminal devices if they lack the desired functional operability data;
    determining that the transmit-mode terminal device that is coupled to a port has distributable desired functional operability data;
    if the transmit-mode terminal device has distributable desired functional operability, transmitting the distributable functional operability data from the transmit-mode terminal device port to the plurality of receive-mode terminal devices in ports to be received by the receive-mode terminal devices for enabling the receive-mode terminal devices with the desired functional operability associated with the data.

2. The method of claim 1 including initially downloading said functional operability data from a management console to a terminal device for converting the terminal device to a transmit-mode device.

3. The method of claim 1 wherein at least one receive-mode terminal device which has received said functional operability data is converted to a transmit-mode terminal device and further comprising repeating the method of claim 1 with the converted transmit-mode device to distribute the functional operability data to a plurality of other terminal devices.

4. The method of claim 1 wherein said trigger event includes the receipt of a trigger signal by the terminal device.

5. The method of claim 1 wherein said terminal devices are automatically configured as either a receive-mode or a transmit-mode terminal device based upon the setting of a selective manual switch.

6. The method of claim 1 wherein the devices have rechargeable power supplies, and further comprising recharging power supplies of the terminal devices during the sharing of the functional operability data.

7. The method of claim 1 wherein the functional operability data allows the device onto a wireless network.

8. The method of claim 1 wherein the ports are either receive ports or transmit ports and further comprising determining if the terminal device coupled to a receive port has the desired functional operability data and, if it does, disabling the terminal device from receiving the transmitted data.

9. The method of claim 1 wherein the data transfer connection is a wired serial connection.

10. The method of claim 1 wherein the data transfer connection is a wireless connection.

11. The method of claim 1 further comprising, prior to transmitting functional operability data, verifying that the data is to be shared with the receive-mode terminal devices.

12. The method of claim 1 wherein the ports are either receive ports or transmit ports and wherein a receive port is only configured to receive the transmitted data but not to transmit data to a transmit port.

13. The method of claim 1 wherein the ports are either receive ports or transmit ports and wherein a transmit port is only configured to transmit the transmitted data to a receive port but not to receive any data from a receive port.

14. The method of claim 1 wherein the ports are either receive ports or transmit ports and wherein at least one of the ports is selectively switchable to act as either a receive port or a transmit port.

15. The method of claim 1 further comprising transmitting functional operability data repeatedly from a transmit-mode device to a receive-mode device.

16. The method of claim 1 further comprising:
    coupling the plurality of enabled receive-mode terminal devices that have the desired functional operability with a plurality of transmit ports and repeating the method steps of claim 1 to proliferate the functional operability to a plurality of terminal devices.

17. The method of claim 2 further comprising, prior to transmitting functional operability data, verifying with the management console that the data is distributable and/or the device is authorized to transmit in transmit-mode.

18. The method of claim 17 further comprising obtaining the data from the management console to be distributed to the receive-mode terminal devices.

19. The method of claim 10 wherein the receive-mode terminal device verifies the transmit-mode terminal device before receiving the data from transmit-mode terminal device.

20. A method for propagating data between multiple devices comprising:
    determining the functional operability of a plurality of devices to assess which devices are properly configured with functional operability data for operating on a wireless network, wherein the devices are each selectively configurable for operating as either a transmit-mode device or a receive-mode device when sharing functional operability data;
    monitoring the occurrence of a trigger event with the terminal devices and determining if a terminal device has desired functional operability data for distribution;
    upon the occurrence of a trigger event, if a device is properly configured with functional operability data for operating on a wireless network, automatically operating the device in a transmit-mode state as a transmit-mode terminal device to transmit functional operability data to another device;
    if a device is not properly configured with functional operability data for operating on a wireless network, automatically operating the device in a receive-mode state as a receive-mode terminal device to receive the functional operability data from the transmit-mode device;

coupling a transmit-mode device and a plurality of receive-mode devices to a plurality of ports that are operably connected together so that the transmitting device and receiving device share the functional operability data;

determining that the functional operability data in the transmit-mode device is distributable and, if the transmit-mode terminal device has distributable functional operability data, transmitting the distributable functional operability data from the transmit-mode device to the plurality of receive-mode devices.

21. The method of claim 20 wherein the ports are connected together with a serial connection.

22. The method of claim 20 further comprising repeatedly transmitting the functional operability data with a transmitting device.

23. The method of claim 20 wherein the functional operability data renders the receiving device properly configured when received thereby.

24. A terminal device for operating on a wireless network comprising:

processing circuitry configured to monitor the occurrence of a trigger event and, upon detecting the trigger event, further configured to verify the functional operability of the terminal device on the wireless network; and communication circuitry;

the processing circuitry, upon verifying the functional operability of the terminal device on the wireless network, further operable for automatically operating the terminal device in a transmit-mode state for transmitting functional operability data to other terminal devices using the communication circuitry and if unable to verify the functional operability of the terminal device on the wireless network, operable for operating the terminal device in a receive-mode state for receiving functional operability data from another terminal device that has a desired functional operability using the communication circuitry;

the processing circuitry further operable for determining that a terminal device in the transmit-mode state has distributable functional operability data, and if it does, operable for transmitting the distributable functional operability data from the transmit-mode terminal device to another terminal device.

25. The terminal device of claim 24 wherein the communication circuitry is configured for serial communications.

26. The terminal device of claim 24 wherein the communication circuitry is configured for wireless communications.

27. The terminal device of claim 24 wherein the trigger event includes the receipt of a trigger signal by the terminal device.

28. The terminal device of claim 24 wherein said terminal device is configured to convert between transmit and receive mode states based upon manual actuation of a switch on the terminal device.

29. The terminal device of claim 25 further comprising electrical connections for interfacing with a battery charger having multiple bays interconnected by a serial communication link.

30. The terminal device of claim 24 configured, if unable to verify functional operability, to first operate in a receive-mode state to receive said functional operability data from a management console or other terminal, and then to operate in a transmit-mode state to distribute said functional operability data to other terminals.

31. The terminal device of claim 24 wherein the processing circuitry is further operable for obtaining the functional operability data from a management console for transmitting to other terminal devices.

32. The terminal device of claim 26 wherein the processing circuitry is operable for verifying the terminal device from which the functional operability data is received.

33. The terminal device of claim 24 further comprising a rechargeable power supply, the trigger event including recharging of the power supply.

34. The terminal device of claim 24 wherein the terminal device is shaped to be placed in a docking bay, the trigger event including the terminal being place in a docking bay.

35. The terminal device of claim 24 wherein, when transmitting, the transmit-mode terminal device cyclically repeats the transmission of the transmitted data to the other terminal devices.

36. The terminal device of claim 24 wherein the data may be made selectively distributable.

37. The terminal device of claim 24, wherein functional operability data is related to a network configuration for being able to communicate with a wireless network.

38. A terminal device comprising:

circuitry configured, when enabled, for communicating with a network, the terminal device operable to monitor for the occurrence of a trigger event for transmitting to or receiving functional operability data from another terminal device;

upon the occurrence of a trigger event, the terminal device operable for determining if it is enabled for communicating with the network;

if enabled, the terminal device further operable for automatically operating in a transmit-mode state for transmitting functional operability data for receipt by another terminal device;

if not enabled, the terminal device further operable for operating in a receive-mode state for receiving functional operability data transmitted by another similarly-configured transmit-mode terminal device;

the terminal device further operable for determining that, if in the transmit-mode state, it has distributable functional operability data, and if it does, operable for transmitting the distributable functional operability data from the transmit-mode terminal device to another terminal device.

39. The terminal device of claim 38 wherein the functional operability data transmitted enables the another terminal device to communicate with a network.

* * * * *

UNITED STATES PATENT AND TRADEMARK OFFICE
CERTIFICATE OF CORRECTION

PATENT NO. : 8,438,239 B2  
APPLICATION NO. : 11/382798  
DATED : May 7, 2013  
INVENTOR(S) : Mark Bradford Mellott et al.

Page 1 of 1

It is certified that error appears in the above-identified patent and that said Letters Patent is hereby corrected as shown below:

On the Title Page

In Column 2, under item (56), References Cited, U.S. Patent Documents, insert
--6,075,780, 06/2000, Mahaney, et al.--

Signed and Sealed this
Eleventh Day of February, 2014

Michelle K. Lee
*Deputy Director of the United States Patent and Trademark Office*